(12) United States Patent
Novack

(10) Patent No.: US 6,791,234 B2
(45) Date of Patent: Sep. 14, 2004

(54) MICROMECHANICAL ROTATION SYSTEM WITH COUPLED ACTUATORS

(75) Inventor: Mitchell J. Novack, Kenmore, WA (US)

(73) Assignee: Intel Corporation, Santa Clara, CA (US)

(*) Notice: Subject to any disclaimer, the term of this patent is extended or adjusted under 35 U.S.C. 154(b) by 126 days.

(21) Appl. No.: 10/270,026

(22) Filed: Oct. 10, 2002

(65) Prior Publication Data

US 2004/0070308 A1 Apr. 15, 2004

(51) Int. Cl.[7] .......................... H02N 1/00; G02B 26/08
(52) U.S. Cl. ..................... 310/309; 359/290; 359/291; 359/225; 385/18
(58) Field of Search .................. 310/309; 359/223–225, 359/290, 291; 385/16, 18

(56) References Cited

U.S. PATENT DOCUMENTS

| | | | |
|---|---|---|---|
| 5,960,132 A | 9/1999 | Lin | 385/18 |
| 6,028,689 A | 2/2000 | Michalicek et al. | 359/224 |
| 6,040,935 A | 3/2000 | Michalicek | 359/198 |
| 6,044,705 A | 4/2000 | Neukermans et al. | 73/504.02 |
| 6,283,601 B1 | 9/2001 | Hagelin et al. | 359/871 |
| 6,480,320 B2 * | 11/2002 | Nasiri | 359/291 |
| 6,533,947 B2 * | 3/2003 | Nasiri et al. | 216/2 |
| 6,614,581 B2 * | 9/2003 | Anderson | 359/295 |
| 6,625,342 B2 * | 9/2003 | Staple et al. | 385/18 |
| 2002/0131679 A1 * | 9/2002 | Nasiri | 385/18 |
| 2002/0131682 A1 * | 9/2002 | Nasiri et al. | 385/18 |
| 2004/0037492 A1 * | 2/2004 | Starr et al. | 385/18 |
| 2004/0070308 A1 * | 4/2004 | Novack | 310/309 |

* cited by examiner

Primary Examiner—Karl Tamai
(74) Attorney, Agent, or Firm—Blakely, Sokoloff, Taylor & Zafman LLP

(57) ABSTRACT

The present invention is directed towards a system for rotating a pedestal through the use of rotatable actuators. First and second rotatable actuators having substantially parallel rotation axes are connected to the pedestal via linkage arms and gimbal springs. A coupling mechanism inhibits the first and second rotatable actuators from simultaneously rotating in the opposite sense about their respective axes.

22 Claims, 6 Drawing Sheets

MICROMECHANICAL ROTATION SYSTEM WITH COUPLED ACTUATORS

FIELD OF THE INVENTION

The present invention relates to a system for rotating a pedestal with at least two coupled actuators.

BACKGROUND OF THE INVENTION

Fiber optic networks have the potential for greatly increasing telecommunication bandwidths and data rates. The demand for increased capacity continues to grow, especially as more and more information is transmitted across the Internet.

One limitation of fiber optic networks as currently implemented is their inability to directly switch optically encoded packets of data from a fiber on a source network or network node to a fiber on a destination network or network node. Instead, optically encoded data are dropped from the source network fiber, converted to electrically encoded data, switched to the destination network using conventional electronic switches, converted back into optically encoded data, and injected into the destination network fiber.

Micromachined mirror arrays offer the ability to directly switch optically encoded data in devices, known as all-optical cross connect switches, from a source fiber on a source network to a destination fiber on a destination network without having to convert the data from optical to electronic and back again. For such mirror arrays to be commercially useful, they must be able to cross connect approximately 1000 input fibers with an equal number of output fibers in a compact volume. This can be achieved with mirrors that can be densely packed together and that are rotatable by relatively large angles in an arbitrary angular direction.

Recent developments in the field of microelectomechanical systems (MEMS) allow for the bulk production of microelectromechanical mirrors and mirror arrays that can be used in all-optical cross connect switches. MEMS-based mirrors and mirror arrays can be inexpensively designed and produced using conventional tools developed for the design and production of integrated circuits. Such tools include computer-aided design, photolithography, bulk and surface micromachining, wet and dry isotropic and anisotropic etching, and batch processing. In addition, deep reactive ion etching methods (DRIE) allow silicon devices to be produced having high aspect ratios (~20:1) that rival those that can be achieved using the prohibitively expensive lithography, electroplating and molding process (LIGA) which requires access to a synchrotron radiation source. (LIGA is an acronym for the German lithographic, galvanoformung und abformung).

A number of microelectromechanical mirror arrays have already been designed for use with MEMS production processes and techniques.

In U.S. patent application Ser. No. 09/779,189 of Nasiri, filed on Feb. 7, 2001, and hereby incorporated by reference in its entirety, a mirror is mounted on a support post mounted on a freely moving plate. In Nasiri, two orthogonally oriented pairs of rotatable actuators are coupled to the freely moving plate by gimbal springs. By properly coordinating each pair of actuators, the mirror can be rotated without displacement under ideal conditions.

Although the Nasiri application shows improved ability to manipulate the mirror rotation without displacement, the performance of similar configurations can be greatly improved by paying special attention to the system used for transmitting rotation from the actuators to the freely moving plate. U.S. patent application Ser. No. 10/225,081 of Starr et al, filed on Aug. 20, 2002 and hereby incorporated by reference in its entirety, discloses special gimbal springs and lever arms for coupling the actuators to a gimbaled platform.

Improvements to the performance of such systems for rotating mirrors can be realized by further reducing out-of-plane displacements of the system. These displacements, which are perpendicular to the mirror face when the mirror is in the neutral position, are also known as z-displacements, and the out-of-plane direction is characterized as the z-direction. With mirror designs similar to those of Nasiri and/or Starr, et al, to achieve large mirror rotations, the torsion springs supporting the actuators need to be relatively compliant. However, compliant torsion springs cause the mirror to be weakly supported in the z-direction. At least two problems are associated with the relatively weak support in the z-direction.

First, weak support in the z-direction can detrimentally affect mirror control. External disturbances in the z-direction cause the mirror to displace and thereby rotate the actuators about their respective axes. Because the actuator gains are typically a function of actuator rotation, the gain of the actuators varies in spite of the fact that the mirror rotation has not changed. If the mirror is controlled by closed-loop servo with mirror rotation as an error feedback, then the change in actuator rotation is unknown and results in errors.

Secondly, if electrostatic actuation is utilized, then the compliancy of the z-displacement creates an unstable snap-down mode wherein actuators on opposite sides of the mirror snap down through opposite-sense rotations. This mode occurs at a lower voltage than the well-known fundamental electrostatic snapdown mode of rotational electrostatic actuators. This lower-voltage z-direction snapdown mode limits the maximum achievable mirror angle.

SUMMARY OF THE INVENTION

The current invention couples two actuators in a manner that inhibits their ability to produce out-of-plane displacements of the system.

In a preferred embodiment, the apparatus comprises a pedestal and first and second rotatable actuators having first and second actuator rotation axes, respectively. The actuator rotation axes are substantially parallel to each other, and define an actuator plane. First and second linkage arms are attached to the first and second rotatable actuators, respectively. First and second gimbal springs connect the respective linkage arms to the pedestal. In preferred embodiments, coordinated rotation of the actuators in the same sense with respect to their axes tends to rotate the pedestal with minimal out-of-plane displacement of the centroid of the pedestal. Simultaneous opposite sense rotations of the first and second rotatable actuators tend to produce out-of-plane displacement of the centroid of the pedestal. Preferred embodiments include a coupling mechanism between the first and second rotatable actuators that inhibits the simultaneous opposite sense rotation of the first and second rotatable actuators. For the purposes herein, the coupling mechanism is a distinct mechanism. Hence the implicit coupling of the first and second rotatable actuators through their respective linkage arms and gimbal springs connected to the pedestal is not to be included in the broad meaning of coupling mechanism as used herein.

Preferred embodiments of the invention can be considered as a method for inhibiting out-of-plane motion of the pedestal. Gimbal springs and linkage arms connect the pedestal to a pair of rotatable actuators, each rotatable actuator having an actuator rotation axis. The out-of-plane motion of the pedestal is inhibited by coupling the pair of rotatable actuators such that the torque for rotating the rotatable actuators increases faster per actuator angle of rotation for actuator rotations in the opposite sense than for actuator rotations the same sense.

Additional features and advantages of the invention will be set forth in part in the description that follows, and in part will be obvious from the description, or may be learned by practice of the invention. Various embodiments of the invention do not necessarily include all of the stated features or achieve all of the stated advantages.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF PREFERRED EMBODIMENTS

Figure 1:
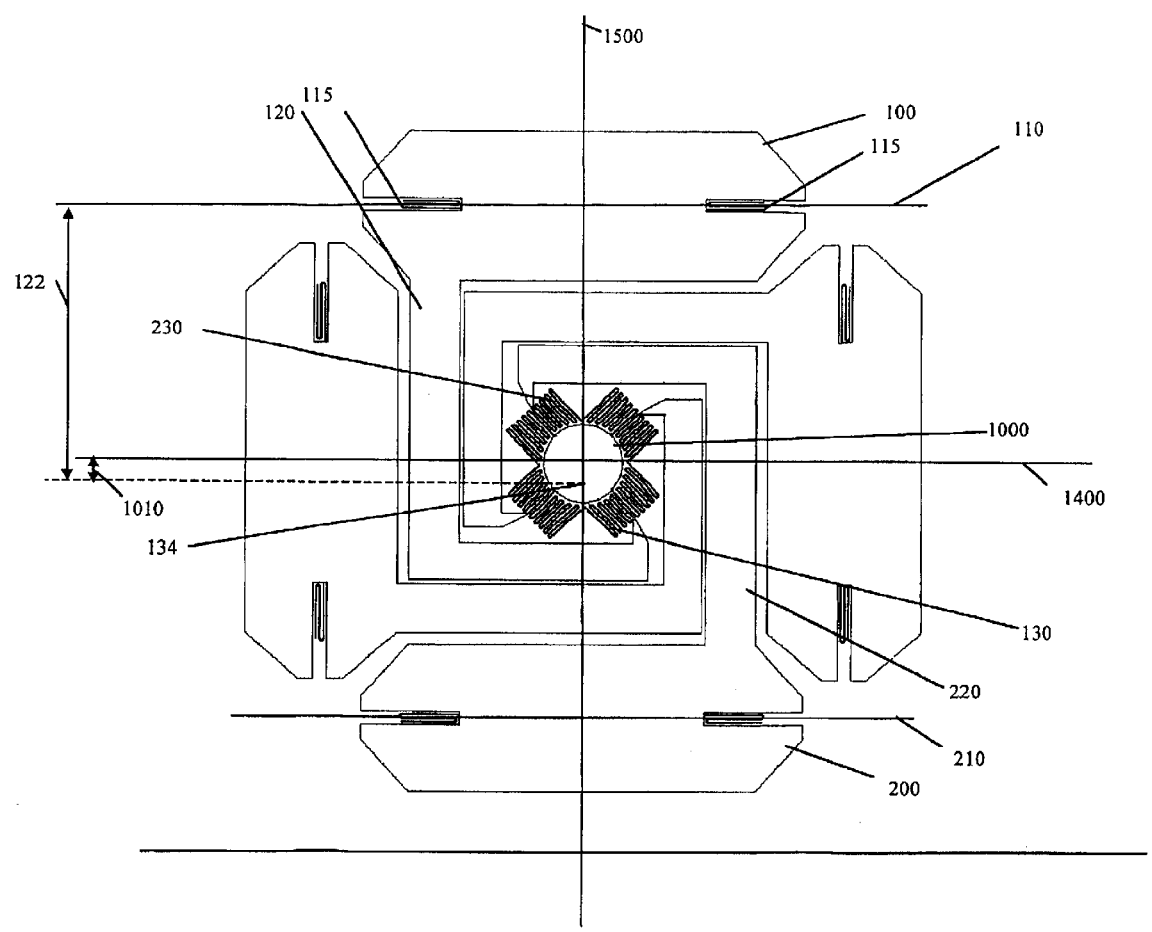
FIG. 1 shows a plan view of a four-actuator system according to Starr et al.

Referring now to the drawings, where similar elements are numbered the same, FIG. 1 shows a plan view of a four-actuator system similar to one disclosed in Starr, et al. Understanding the various components and nomenclature associated with this simpler system will help in appreciating the current invention.

In FIG. 1, a pedestal 1000 is supported by four gimbal springs. To remove clutter in the drawing, only the first gimbal spring 130 and the second gimbal spring 230 are explicitly labeled. The gimbal springs connect the pedestal 1000 to linkage arms, which are attached to rotatable actuators. Again, only the first 120 and second 220 linkage arms and the first 100 and second 200 rotatable actuators are explicitly labeled. The first rotatable actuator 100 has a first actuator rotation axis 110 about which it rotates. Similarly the second rotatable actuator 200 has a second actuator rotation axis 210 about which it rotates. The first and second actuator rotation axes 110 and 210 are substantially parallel. Hence these two actuator rotation axes define a plane, which is denoted the actuator plane. For convenience later, we now define a pedestal x-rotation axis 1400 and a pedestal y-rotation axis 1500. These axes are mutually orthogonal and define the axes about which the pedestal 1000 rotates in response to rotations of the actuators. As illustrated in FIG. 1, the pedestal x-rotation axis 1400 is the axis of rotation of the pedestal in response to same sense rotations of the first rotatable acutator 100 and the second rotatable actuator 200. In preferred embodiments, the rotatable actuators, linkage arms, and gimbal springs are symmetrically arranged, although the inventions in Starr, et al and herein permit asymmetric arrangements.

First actuator springs 115 are labeled for the first rotatable actuator 100. The other rotatable actuators also include their own actuator springs. Although actuator springs are generally present, they are not required for the present invention.

The rotatable actuators may be rotated using any appropriate means known to those skilled in the art. For instance, electrostatic, piezoelectric, electromagnetic, thermal, and fluidic actuation are some of the possible actuation means. The most preferred embodiments employ electrostatic actuation.

In the embodiment illustrated in FIG. 1, the linkage arms are known as wraparound linkage arms because their associated gimbal spring effective pivots are on the side of the pedestal opposite the rotatable actuator. Specifically, the first rotatable actuator 100 is attached to a first linkage arm 120 that wraps around the pedestal 1000. The first gimbal spring 130 connects the first linkage arm 120 to the pedestal 1000 and has a first gimbal spring effective pivot 134 on the opposite side of the pedestal 1000 than the first rotatable actuator 100. In this particular example, the first gimbal spring effective pivot 134 is on the opposite side of the pedestal x-rotation axis 1400. Although commonly used in collaboration with the present invention, wraparound linkage arms are not necessary. Embodiments with linkage arms that do not wrap around the pedestal are also included within the scope of the present invention. For examples of non-wraparound linkage arms see the embodiments in Nasiri and some of the embodiments disclosed in Starr, et al.

The first gimbal spring effective pivot 134 is the effective location about which the gimbal spring bends. As discussed in Starr, et al, the particular gimbal spring shown in FIG. 1 places the gimbal spring effective pivot particularly close to the pedestal x-rotation axis. The particular type of gimbal spring is not critical to the present invention.

For later reference, a first linkage length 122 is defined as the distance from the first actuator rotation axis 110 to the first gimbal spring effective pivot 134. The first linkage length is denoted $L_1$. Corresponding definitions apply to the second linkage length, etc. A first pedestal distance 1010 is defined as the distance from the first gimbal spring effective pivot 134 to the pedestal x-rotation axis 1400. The first pedestal distance is denoted by $D_1$. A corresponding definition applies to the second pedestal distance. However, should third and fourth pedestal distances be desired, the pedestal y-rotation axis 1500 should be substituted for the pedestal x-rotation axis 1400. For consistency in equations that will be discussed later, with wraparound linkage arms the pedestal distance should be negative because the pedestal distance is being measured in a direction opposite to that of the linkage length. By using a negative pedestal distance for wraparound linkage arms, the same equations can be used for both wraparound and nonwraparound linkage arms.

Figure 2:
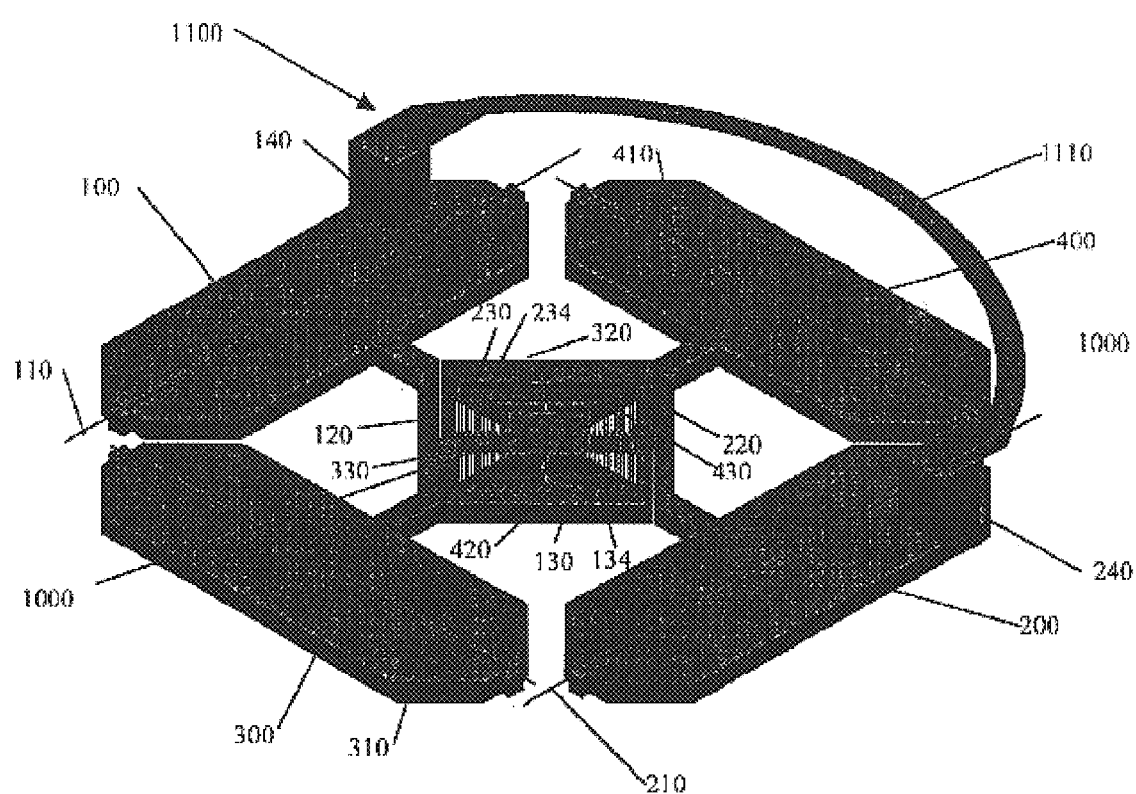
FIG. 2 is a perspective view of an embodiment of an actuator system with two of the rotatable actuators coupled.

FIG. 2 is a perspective view of an embodiment of the invention. The pedestal 1000 is in the center. Note that the pedestal 1000 in this embodiment is rectangular, while the pedestal 1000 in FIG. 1 is round. The particular shape of the pedestal 1000 is not critical to this invention.

In FIG. 2, a first rotatable actuator 100, having a first actuator rotation axis 110 is shown in the upper left. A second rotatable actuator 200, having a second actuator rotation axis 210 is shown in the lower right of the figure. The first actuator rotation axis 110 and the second actuator rotation axis 210 are substantially parallel and define an actuator plane. A first linkage arm 120 is attached to the first rotatable actuator 100 and a second linkage arm 220 is attached to the second rotatable actuator 200. A first gimbal spring 130 connects the first linkage arm 120 to the pedestal 1000. Similarly, a second gimbal spring 230 connects the second linkage arm 220 to the pedestal 1000. Wraparound linkage arms are used in this embodiment, but the gimbal springs illustrated here are different from those shown in FIG. 1. The gimbal springs shown in this embodiment do not place the gimbal spring effective pivots so close to the pedestal center. In fact, the first gimbal spring effective pivot 134 and the second gimbal spring effective pivot 234 are not located in the pedestal 1000, as they were in FIG. 1. As mentioned earlier, the invention does not require any specific gimbal spring to be used.

The embodiment of the invention shown in FIG. 2 includes a coupling mechanism 1100 that inhibits the first rotatable actuator 100 and the second rotatable actuator 200 from simultaneously rotating in the opposite sense about their respective axes. The particular coupling mechanism 1100 illustrated in FIG. 2 includes a first standoff column 140 mounted on the first rotatable actuator 100, a second standoff column 240 mounted on the second rotatable actuator 200, and a flexure 1110 joining the first standoff column 140 and the second standoff column 240. Rotation of the first 100 and second 200 rotatable actuators in the same the opposite sense tends to stretch the flexure 1110, which is difficult. On the other hand, same sense rotations of the rotatable actuators can easily be done if the flexure does not excessively resist twisting motions. As shown in FIG. 2, in preferred forms of such embodiments the flexure 1110 is thin in the direction perpendicular to the actuator plane relative to its dimensions parallel to the actuator plane. The thin, substantially flat flexure twists relatively easily, thereby allowing same-sense rotations. However the substantially flat flexure provides considerable resistance to opposite-sense rotations.

Figure 3:
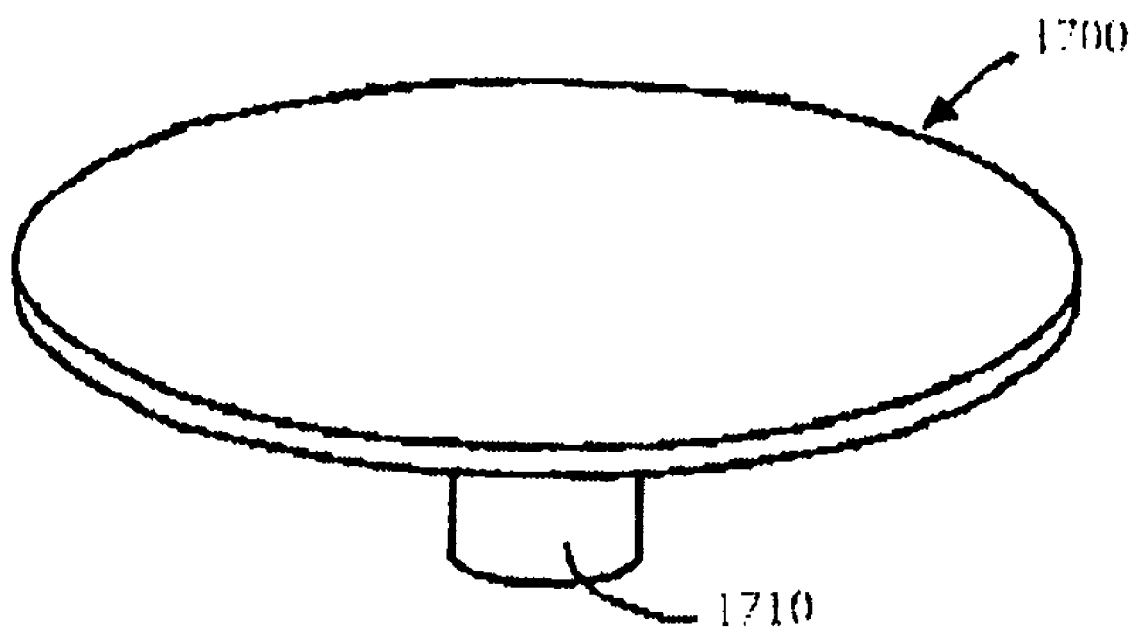
FIG. 3 shows a perspective view of a mirror and post that can optionally be mounted on the pedestal.

FIG. 3 shows a mirror 1700 mounted on a post 1710. In embodiments of mirror arrays, the post 1710 is mounted on the pedestal 1000. In this particular embodiment the post 1710 is a circular cylinder and the mirror 1700 is a slightly elliptical disk, although their shapes are not critical to the invention. However, in the preferred embodiments, the post has a diameter between about 50 $\mu$m and 70 $\mu$m and a length of between 75 $\mu$m and 95 $\mu$m. Most preferably, the post has a diameter of about 60 $\mu$m and a length of about 85 $\mu$m. In preferred embodiments, the mirror has a thickness between about 25 $\mu$m and 35 $\mu$m, most preferably about 30 $\mu$m. In the most preferred embodiments, the mirror has a major axis of about 1100 $\mu$m and a minor axis of about 1000 $\mu$m. The major axis is typically aligned perpendicular to the first and second actuator axes. In the most preferred embodiments, the mirror 1700 is substantially flat and is disposed in substantially the same plane as the flexure 1110.

The embodiment illustrated in FIG. 2 also includes a third rotatable actuator 300 having a third actuator rotation axis 310 and a fourth rotatable actuator 400 having a fourth actuator rotation axis 410. The third and fourth actuator rotation axes 310 and 410 are substantially parallel to each other and are substantially perpendicular to the first actuator rotation axis 110. Third and fourth linkage arms 320 and 420 attach to the third 300 and fourth 400 rotatable actuators, respectively. A third gimbal spring 330 connects the third linkage arm 320 to the pedestal 1000, while a fourth gimbal spring 430 connects the fourth linkage arm 420 to the pedestal 1000. As discussed in Nasiri, this arrangement allows for generalized rotation of the pedestal 1000, and the hence the mirror 1700.

Figure 4:
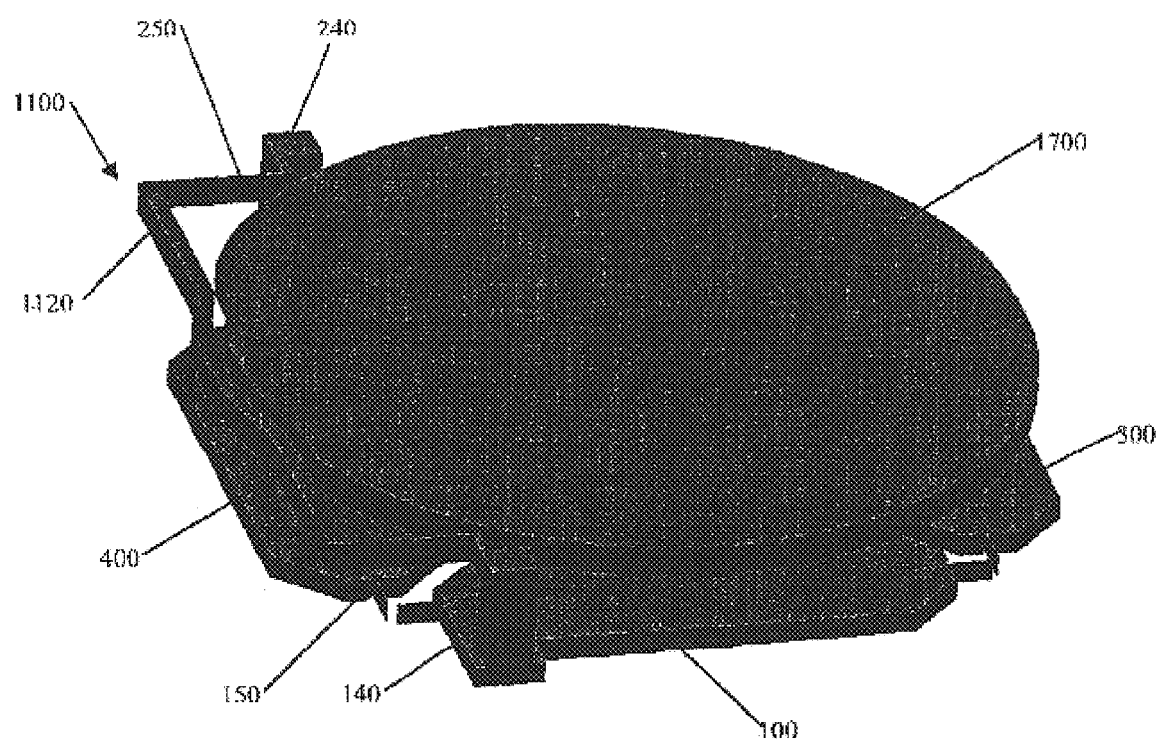
FIG. 4 shows a perspective view of another embodiment of a coupled actuator system. A mirror obscures the second rotatable actuator.

FIG. 4 illustrates another embodiment of the invention. In the figure, the mirror 1700 is shown mounted on its post (obscured) which is mounted on the pedestal (obscured). The mirror 1700 also obscures much of the four rotatable actuators, although portions of the first 100, third 300 and fourth 400 rotatable actuators can be seen. As with the embodiment illustrated in FIG. 2, the coupling mechanism 1100 in this embodiment includes a first standoff column 140 mounted on the first rotatable actuator 100 and a second standoff column 240 mounted on the second rotatable actuator 200. However, instead of a flexure joining the standoff columns, a coupling bar 1120 joins a first compliant hinge 150 to a second compliant hinge 250. The first compliant hinge 150 is connected to the first standoff column 140. It is disposed a first standoff height above the first rotatable actuator 100. Similarly, the second compliant hinge 250 is connected to the second standoff column 240 and is disposed a second standoff height above the second rotatable actuator (which is obscured by the mirror).

In preferred embodiments, the coupling mechanism 1100 is configured such that the torque required to rotate the first rotatable actuator 100 and the second rotatable actuator 200 in the opposite sense about their respective axes 110 and 210 is greater than the torque required to rotate the first 100 and second 200 rotatable actuators in the same sense about their respective axes 110 and 210.

Preferably, the coupling bar 1120 is substantially rigid and the first compliant hinge 150 and the second compliant hinge 250 are chosen such that they are relatively stiff to displacements parallel to the actuator plane, but are relatively compliant to twisting motions. One way in which this is achieved is shown in FIG. 4, where the first compliant hinge 150 is thinner in one dimension parallel to the actuator plane than perpendicular to the actuator plane. In the illustrated embodiment, the first compliant hinge 150 is considerably deeper (perpendicular to the actuator plane) than is its dimension perpendicular to the first actuator rotation axis (one of its dimensions parallel to the actuator plane). The second compliant hinge 250 is also thinner in one dimension parallel to the actuator plane than perpendicular to the actuator plane. For preferred embodiments the compliant hinges are approximately 20 to 50 $\mu$m deep, 1 to 3 $\mu$m wide, and approximately 50 to 150 $\mu$m long. Most preferably, the compliant hinges are approximately 30 $\mu$m deep, 1 to 2 $\mu$m wide and approximately 100 $\mu$m long.

Figure 5:
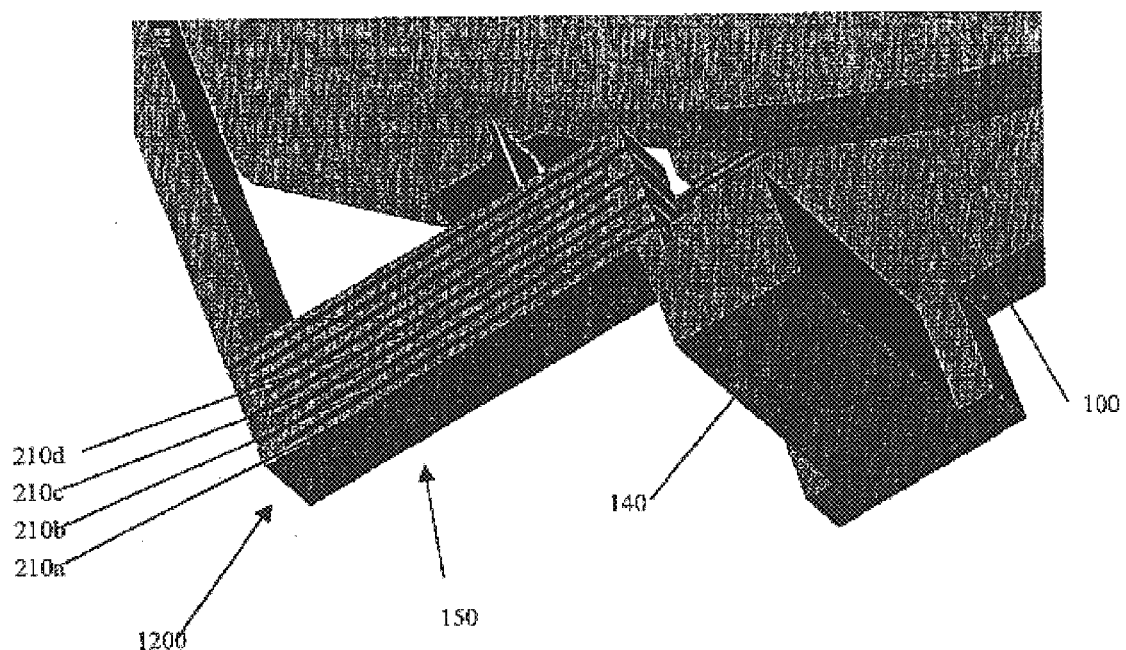
FIG. 5 illustrates an alternative compliant hinge that can be used with a coupled actuator system.

A serpentine spring 1200 is shown as the first compliant hinge 150 in FIG. 5. The serpentine spring 1200 comprises a plurality of spring legs, four of which are labeled 1210a, 1210b, 1210c, 1210d. The spring legs are coupled in series. Each spring leg is thinner in one dimension parallel to the actuator plane than perpendicular to the actuator plane. The serpentine spring 1200 allows for considerable twisting, but is relatively stiff to displacements parallel to the actuator plane. In preferred embodiments a serpentine spring has three or more legs with each leg being approximately 1 to 3 $\mu$m wide. Depth and length preferences for each spring leg of serpentine springs are similar to those described earlier for compliant hinges.

Returning now to FIG. 4, note that the mirror 1700 is substantially flat and lies in substantially the same plane as the coupling bar 1120. During manufacturing, the coupling bar 1120, and if desired, the compliant hinges 150 and 250 can be fabricated in the same layer as the mirror 1700. Fabricating all these components in a single layer reduces the number of fabrication steps and therefore the manufacturing costs are lessened.

In the embodiment shown in FIG. 4, the coupling bar 1120 is not straight, but instead includes a small bowed region to accommodate the mirror 1700. In addition, a small section of the mirror 1700 is notched to avoid interfering with the coupling bar 1120. Neither the bowed nor notched regions are necessary to the invention, but illustrate possible variations that may be used in the practical application of the invention. In another embodiment the coupling bar 1120 is straight and the mirror 1700 is notched more severely. Alternatively, the mirror 1700 retains its elliptical shape and the coupling bar 1120 is bowed more severely. In yet another embodiment, the mirror retains its elliptical shape, the coupling bar 1120 is straight, but the first and second compliant hinges 150 and 250 are lengthened, so that no interference occurs.

Figure 6:
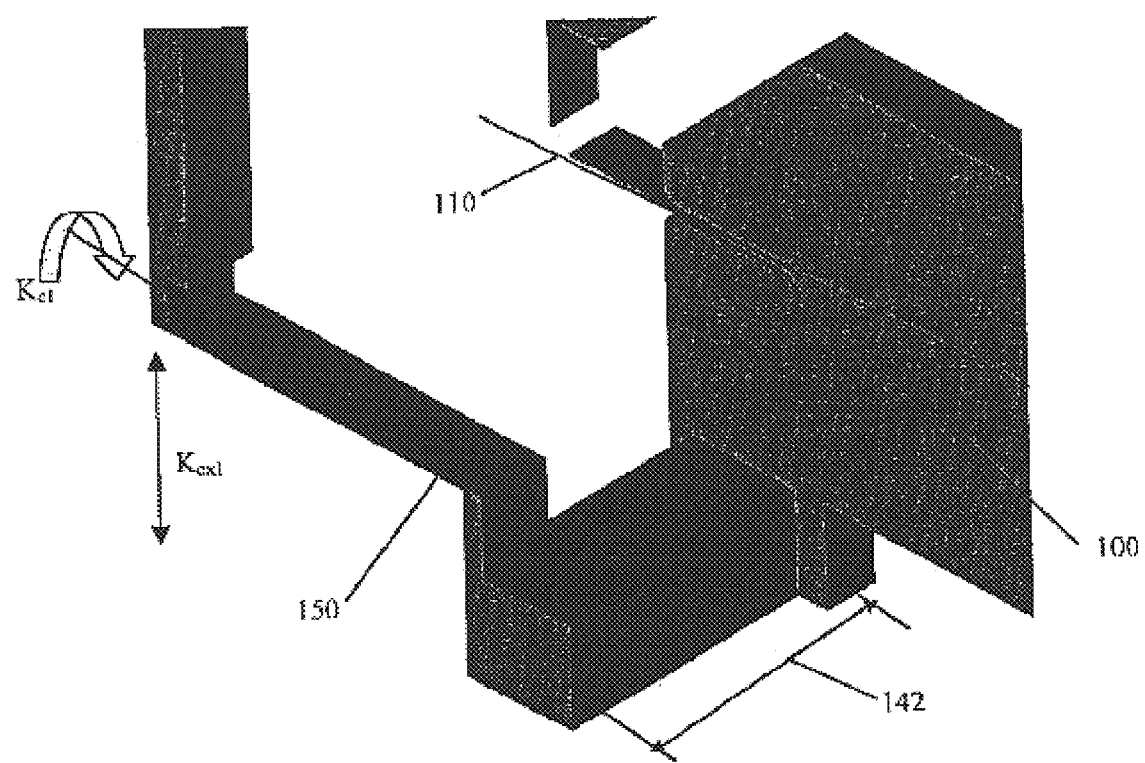
FIG. 6 indicates the directions of motion that define various spring constants. The definition of a standoff distance is also illustrated.

Although not required for all embodiments, preferred embodiments of the invention include quantifiable relationships between some of the components and the geometry. FIG. 6 illustrates details of some of the quantities that are useful in describing these preferred relationships. A first standoff height 142 is the distance from the first actuator 100 to the first compliant hinge 150. To be more definite, the first standoff height 142 is the distance perpendicular to the actuator plane from the middle of the first rotatable actuator 100 to the middle of the first compliant hinge 150. This distance is denoted $R_1$. A similar definition applies to the second standoff height, which will be denoted $R_2$.

The first compliant hinge 150 has a first hinge rotational stiffness, which is denoted $K_{c1}$. The first hinge rotational stiffness relates the applied torque to angular rotation about an axis parallel to the first actuator rotation axis 110. In essence, the first hinge rotational stiffness characterizes the ability of the first compliant hinge 150 to twist, as symbolized by the rotating arrow near $K_{c1}$ in FIG. 6. Note that the twisting axis is parallel to the first actuator rotation axis 110. A corresponding definition applies to the second hinge rotational stiffness, which is denoted $K_{c2}$.

The first hinge in-plane displacement stiffness is denoted by $K_{cx1}$. It relates applied force to displacement substantially parallel to the actuator plane and directed substantially along a line joining the first and second compliant hinges. The double arrow adjacent to $K_{cx1}$ in FIG. 6 is representative of the deflections associated with the first hinge in-plane displacement stiffness. A corresponding definition applies to the second hinge in-plane displacement stiffness, which is denoted $K_{cx2}$.

Detailed analysis of the system with and without the coupling mechanism indicates that the addition of the coupling mechanism adds to the system out-of-plane stiffness by an amount $(K_{c1}+K_{cx1} R_1^2)/L_1^2+(K_{c2}+K_{cx2} R_2^2)/L_2^2$ where $L_1$ is the previously defined first linkage length and $L_2$ is a similarly defined second linkage length. Although increasing the out-of-plane stiffness is desirable, increasing $K_{c1}$ or $K_{c2}$ increases the torque required to rotate the actuators, which is undesirable. Hence, the objective of increasing the system out-of-plane stiffness is preferentially achieved by increasing $K_{cx1} R_1^2$ and $K_{cx2} R_2^2$. The preferential increase of these quantities is quantified as $(K_{cx1}(R_1/L_1)^2+K_{cx2}(R_2/L_2)^2)/(K_{c1}/L_1^2+K_{c2}/L_2^2)>1$. Most preferred embodiments satisfy a more stringent condition: $(K_{cx1}(R_1/L_1)^2+K_{cx2}(R_2/L_2)^2)/(K_{c1}/L_1^2+K_{c2}/L_2^2)>10$.

Further analysis suggests that in preferred embodiments, the ratio $(K_{cx1}R_1^2+K_{cx2}R_2^2)/\{(L_1/D_1)(2+(L_1/D_1))K_{g1}+[(L_2/D_2)(2+(L_2/D_2)]K_{g2}+(K_{c1}+K_{c2})\}$ should be greater than 1. In this expression, $K_{g1}$ is the first gimbal spring rotational stiffness, which is measured about an axis parallel to the first actuator rotation axis. Similarly, $K_{g2}$ is the second gimbal spring rotational stiffness, which is measured about an axis parallel to the second actuator rotation axis.

In the most preferred embodiments, the ratio $(K_{cx1}R_1^2+K_{cx2}R_2^2)/\{(L_1/D_1)(2+(L_1/D_1))K_{g1}+[(L_2/D_2)(2+(L_2/D_2))]K_{g2}+(K_{c1}+K_{c2})\}$ is greater than 10. Although these expressions were derived for cases in which the magnitude of the first and second actuator rotation angles are very similar, the expressions are useful design criteria regardless of whether the system is symmetric.

The use of the coupling mechanism can be thought of as a method for inhibiting out-of-plane motion of the pedestal. This is accomplished by coupling the first and second rotatable actuators such that the torque for rotating the rotatable actuators increases faster per actuator angle of rotation for actuator rotations of opposite sense than for actuator rotations of the same sense. Hence, actuator rotations of opposite sense get harder more quickly as actuator rotation angle increases than for the case of same-sense actuator rotations.

The coupling mechanism can significantly improve the performance of the system. The examples provided below indicate results obtained by finite element analysis. Four configurations were compared, a baseline and three configurations with coupling mechanisms. The coupled configurations were substantially similar to the embodiment illustrated in FIG. 4, although one of the coupled configurations included serpentine springs for the compliant hinges, as shown in FIG. 5.

The compliant hinge widths are the dimension of the compliant hinges parallel to the actuator plane in the direction connecting the first and second compliant hinges.

The various configurations included compliant hinge widths of 1.3 $\mu$m, 1.5 $\mu$m, and 3 $\mu$m, where the 3 $\mu$m width was achieved with a serpentine spring using three legs (the 3 $\mu$m being measured across the legs of the serpentine spring). In these example configurations, the compliancies of actuator springs were varied so that the total system out-of-plane stiffness was approximately equal to the baseline case. Greater compliancy (or reduced stiffness) of the actuator springs results in a reduced energy requirement to rotate the rotatable actuators. For electrostatically driven actuators, this implies that the actuation voltage for a given rotation is lessened.

Although the coupling mechanism in the examples couples the rotatable actuators that rotate parallel to the pedestal x-rotation axis, the coupling mechanism allows for reduced actuator spring stiffnesses in the rotatable actuators that are parallel to both the pedestal x-rotation axis and the pedestal y-rotation axis. This is because the coupling mechanism increases the out-of-plane stiffness regardless of whether the rotating actuators are parallel to the pedestal x-rotation axis or the pedestal y-rotation axis.

For electrostatically driven actuators, with an 11 $\mu$m electrode gap, Table 1 shows the voltage requirements for rotating the pedestal 6.2 degrees about the pedestal x-rotation axis and 7.5 degrees about the pedestal y-rotation axis. Significant reductions in required voltages are observed for all three designs that employ coupling mechanisms.

TABLE 1

Comparison Of Voltage Requirements For Three Coupler Designs Relative To Baseline

|  | Voltage To Rotate 6.2° about Pedestal x-rotation axis | Voltage To Rotate 7.5° about Pedestal y-rotation axis |
| --- | --- | --- |
| Baseline | 92 V | 99 V |
| 3 μm Wide Serpentine Compliant Hinges | 69 V | 57 V |
| 1.5 μm Wide Compliant Hinges | 83 V | 78 V |
| 1.3 μm Wide Compliant Hinges | 73 V | 68 V |

The above-described micro-mechanical rotation systems can be fabricated with known MEMS fabrication techniques. Details of how similar systems are fabricated in the context of a mirror array are described by Nasiri, Smith, Marx, and Novack in U.S. patent application Ser. No. 09/894,021, filed Jun. 27, 2001, which is hereby incorporated by reference in it entirety.

The above description and drawings are only illustrative of preferred embodiments, and the present invention is not intended to be limited thereto. Any modification of the present invention that comes within the spirit and scope of the following claims is considered part of the present invention.

What is claimed is:

1. An apparatus, comprising:

a pedestal;

a first rotatable actuator having a first actuator rotation axis;

a second rotatable actuator having a second actuator rotation axis, the second actuator rotation axis being substantially parallel to the first actuator rotation axis, the first actuator rotation axis and the second actuator rotation axis defining an actuator plane;

a first linkage arm attached to the first rotatable acutator;

a second linkage arm attached to the second rotatable actuator;

a first gimbal spring connecting the first linkage arm to the pedestal, the first gimbal spring having a first gimbal spring effective pivot;

a second gimbal spring connecting the second linkage arm to the pedestal, the second gimbal spring having a second gimbal spring effective pivot; and a coupling mechanism that inhibits the first rotatable actuator and the second rotatable actuator from simultaneously rotating in the opposite sense about their respective axes.

2. The apparatus, according to claim 1, wherein the coupling mechanism comprises:

a first standoff column mounted on the first rotatable actuator;

a second standoff column mounted on the second rotatable actuator; and a flexure joining the first standoff column and the second standoff column.

3. The apparatus, according to claim 2, wherein the flexure is thin in the direction perpendicular to the actuator plane relative to its dimensions parallel to the actuator plane.

4. The apparatus, according to claim 3, further comprising:

a post mounted on the pedestal; and a mirror mounted on the post.

5. The apparatus, according to claim 4, wherein the mirror is substantially flat and lies in substantially the same plane as the flexure.

6. The apparatus, according to claim 2, further comprising:

a third rotatable actuator having a third actuator rotation axis;

a fourth rotatable actuator having a fourth actuator rotation axis, the fourth actuator rotation axis being substantially parallel to the third actuator rotation axis, the first actuator rotation axis and the third actuator rotation axis being substantially perpendicular;

a third linkage arm attached to the third rotatable acutator;

a fourth linkage arm attached to the fourth rotatable actuator;

a third gimbal spring connecting the third linkage arm to the pedestal; and a fourth gimbal spring connecting the fourth linkage arm to the pedestal.

7. The apparatus, according to claim 1, wherein the coupling mechanism comprises:

a first standoff column mounted on the first rotatable actuator;

a second standoff column mounted on the second rotatable actuator;

a first compliant hinge connected to the first standoff column, the first compliant hinge being disposed a first standoff height from the first rotatable actuator;

a second compliant hinge connected to the second standoff column, the second compliant hinge being disposed a second standoff height from the second rotatable actuator;

a coupling bar joining the first compliant hinge to the second compliant hinge.

8. The apparatus, according to claim 7, wherein the coupling bar is substantially rigid.

9. The apparatus, according to claim 7, wherein the coupling mechanism increases the torque required to rotate the first and second rotatable actuators in the opposite sense about their respective axes without substantially increasing the torque required to rotate the first and second rotatable actuators in the same sense about their respective axes.

10. The apparatus, according to claim 7, wherein the first compliant hinge is thinner in one dimension parallel to the actuator plane than perpendicular to the actuator plane.

11. The apparatus, according to claim 10, wherein the second compliant hinge is thinner in one dimension parallel to the actuator plane than perpendicular to the actuator plane.

12. The apparatus, according to claim 7, further comprising:

a post mounted on the pedestal; and a mirror mounted on the post.

13. The apparatus, according to claim 12, wherein the mirror is substantially flat and lies in substantially the same plane as the coupling bar.

14. The apparatus, according to claim 7, wherein the first compliant hinge is a serpentine spring.

15. The apparatus, according to claim 14, wherein the serpentine spring comprises a plurality of spring legs coupled in series, each spring leg being thinner in one dimension parallel to the actuator plane than perpendicular to the actuator plane.

16. The apparatus, according to claim 15, further comprising:
a post mounted on the pedestal; and
a mirror mounted on the post.

17. The apparatus, according to claim 16, wherein the mirror is substantially flat and lies in substantially the same plane as the coupling bar.

18. The apparatus, according to claim 7, further comprising:
a third rotatable actuator having a third actuator rotation axis;
a fourth rotatable actuator having a fourth actuator rotation axis, the fourth actuator rotation axis being substantially parallel to the third actuator rotation axis, the first actuator rotation axis and the third actuator rotation axis being substantially perpendicular;
a third linkage arm attached to the third rotatable acutator;
a fourth linkage arm attached to the fourth rotatable actuator;
a third gimbal spring connecting the third linkage arm to the pedestal; and
a fourth gimbal spring connecting the fourth linkage arm to the pedestal.

19. The apparatus, according to claim 7, wherein:
the first compliant hinge has a first hinge rotational stiffness relating applied torque to angular rotation about an axis parallel to the first actuator rotation axis, the first hinge rotational stiffness being denoted $K_{c1}$;
the second compliant hinge has a second hinge rotational stiffness relating applied torque to angular rotation about an axis parallel to the second actuator rotation axis, the second hinge rotational stiffness being denoted $K_{c2}$;
the first compliant hinge has a first hinge in-plane displacement stiffness relating applied force to displacement substantially parallel to the actuator plane and directed substantially along a line joining the first and second compliant hinges, the first hinge in-plane displacement stiffness being denoted by $K_{cx1}$;
the second compliant hinge has a second hinge in-plane displacement stiffness relating applied force to displacement substantially parallel to the actuator plane and directed substantially along a line joining the first and second compliant hinges, the second hinge in-plane displacement stiffness being denoted by $K_{cx2}$;
a first linkage length is defined as the distance from the first actuator rotation axis to the first gimbal spring effective pivot, the first linkage length being denoted $L_1$;
a second linkage length is defined as the distance from the second actuator rotation axis to the second gimbal spring effective pivot, the second linkage length being denoted $L_2$;
the first standoff height is denoted by $R_1$;
the second standoff height is denoted by $R_2$; and
the ratio $(K_{cx1}(R_1/L_1)^2 + K_{cx2}(R_2/L_2)^2)/(K_{c1}/L_1^2 + K_{c2}/L_2^2)$ is greater than 1.

20. The apparatus, according to claim 19, wherein:
the ratio $(K_{cx1}(R_1/L_1)^2 + K_{cx2}(R_2/L_2)^2)/(K_{c1}/L_1^2 + K_{c2}/L_2^2)$ is greater than 10.

21. The apparatus, according to claim 7, wherein:
the first compliant hinge has a first hinge rotational stiffness relating applied torque to angular rotation about an axis parallel to the first actuator rotation axis, the first hinge rotational stiffness being denoted $K_{c1}$;
the second compliant hinge has a second hinge rotational stiffness relating applied torque to angular rotation about an axis parallel to the second actuator rotation axis, the second hinge rotational stiffness being denoted $K_{c2}$;
the first compliant hinge has a first hinge in-plane displacement stiffness relating applied force to displacement substantially parallel to the actuator plane and directed substantially along a line joining the first and second compliant hinges, the first hinge in-plane displacement stiffness being denoted by $K_{cx1}$;
the second compliant hinge has a second hinge in-plane displacement stiffness relating applied force to displacement substantially parallel to the actuator plane and directed substantially along a line joining the first and second compliant hinges, the second hinge in-plane displacement stiffness being denoted by $K_{cx2}$;
a first linkage length is defined as the distance from the first actuator rotation axis to the first gimbal spring effective pivot, the first linkage length being denoted $L_1$;
a second linkage length is defined as the distance from the second actuator rotation axis to the second gimbal spring effective pivot, the second linkage length being denoted $L_2$;
the first standoff height is denoted by $R_1$;
the second standoff height is denoted by $R_2$;
the first gimbal spring has a first gimbal spring rotational stiffness measured about an axis parallel to the first actuator rotation axis, the first gimbal spring rotational stiffness being denoted $K_{g1}$;
the second gimbal spring has a second gimbal spring rotational stiffness measured about an axis parallel to the second actuator rotation axis, the second gimbal spring rotational stiffness being denoted $K_{g2}$;
a pedestal x-rotation axis is defined as the axis of rotation of the pedestal in response to same-sense rotations of the first and second rotatable actuators;
a first pedestal distance is defined as the distance from the first gimbal spring effective pivot to the pedestal x-rotation axis, the first pedestal distance being denoted by $D_1$;
a second pedestal distance is defined as the distance from the second gimbal spring effective pivot to the pedestal x-rotation axis, the second pedestal distance being denoted by $D_2$; and
the ratio $(K_{cx1} R_1^2 + K_{cx2} R_2^2)/\{(L_1/D_1)(2+(L_1/D_1))K_{g1} + [(L_2/D_2)(2+(L_2/D_2))]K_{g2} + (K_{c1}+K_{c2})\}$ is greater than 1.

22. The apparatus, according to claim 21, wherein:
the ratio $(K_{cx1} R_1^2 + K_{cx2} R_2^2)/\{(L_1/D_1)(2+(L_1/D_1))K_{g1} + [(L_2/D_2+(L_2/D_2))]K_{g2} + (K_{c1}+K_{c2})\}$ is greater than 10.

* * * * *